United States Patent Office
3,786,042
Patented Jan. 15, 1974

3,786,042
BIS-(BENZAMIDOAZO)-4,4'-BI-ACETOACETYL-o-CHLOROANILIDE DYESTUFFS
Francis A. Formica, New Shrewsbury, and James Izenberg, Metuchen, N.J., assignors to Indol Chemical Co., Inc., Carteret, N.J.
No Drawing. Filed July 6, 1971, Ser. No. 160,219
Int. Cl. C09b 33/16
U.S. Cl. 260—176
8 Claims

ABSTRACT OF THE DISCLOSURE

Disazo-dyestuffs of the formula

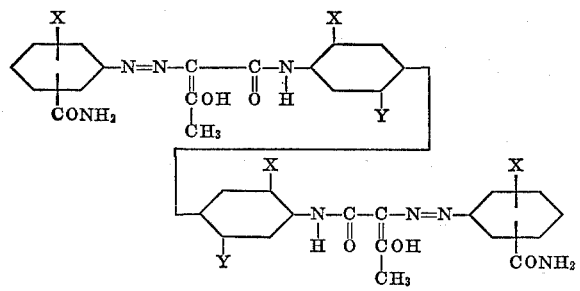

in which X represents H, lower alkyl, alkoxy, or halogen and Y represents H or halogen and all of the X's are not necessarily the same and all of the Y's are not necessarily the same and the $CONH_2$ group is m- or p- to the diazo group. These dyestuffs exhibit good solvent fastness and light fastness, high coloring strength and greenish shades of yellow.

This invention relates to disazo dyestuffs exhibiting excellent solvent fastness and excellent light fastness in a bright green shade of yellow, the dyestuffs being of the general formula above,

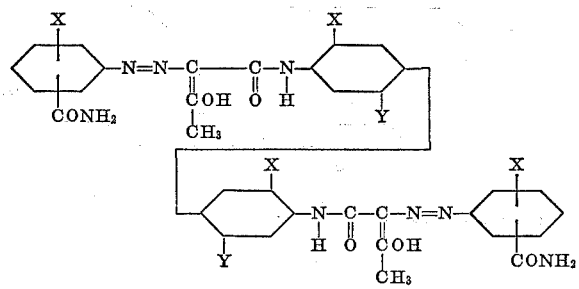

in which X represents H, lower alkyl, alkoxy, or halogen and Y represents H or halogen and all of the X's are not necessarily the same and all of the Y's are not necessarily the same and the $CONH_2$ group is m- or p- to the diazo group.

Dyestuffs of the indicated structure are produced by coupling an acetoacetyl analide with a suitably substituted carbamide after it has been diazotized.

Suitable carbamides include those represented by one of the following formulas:

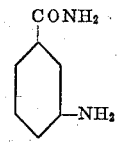

3 amino carbamide

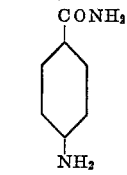

4 amino carbamide

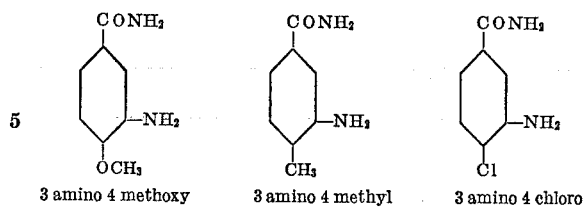

3 amino 4 methoxy   3 amino 4 methyl   3 amino 4 chloro

In general, the pigments of this invention are formed by diazotizing a suitable carbamide and then reacting the resulting diazo compound with a bis-aceto-acetchloroanilide.

The invention will be more fully understood from the examples which follow in which preferred embodiments of the invention are described.

EXAMPLE 1

Fifteen (15) grams of 3-amino, 4-methyl carbamide was added to 300 grams of water in a beaker. Then sixty (60) grams of 20° Baumé HCl was added to the beaker. The resulting solution was cooled to between about 0° C. and 5° C. on an ice bath and then seven (7) grams of a solution of sodium nitrite dissolved in water was added to the chilled mixture. The contents of the beaker was stirred for one hour while maintaining the temperature between about 0° C. and 5° C. Then pulverized carbon and filter aid were added to the stirred mixture and then the mixture was filtered. Excess sodium nitrite was removed by the addition of sulfamic acid. Thirty (30) grams of sodium acetate was then added to remove acidity to Congo indicator.

In another beaker containing 200 grams of water, the following were added in succession:

50 grams isopropanol
36 grams KOH (45%)
21 grams 4,4'-bi-aceto-acet-o-chloranilide The additions to the beaker were dissolved by heating to about 35° C. to 40° C. When all of the additions had dissolved, ice was added to cool the solution to between 0° C. and 5° C. The chilled chloroanilide mixture in the second beaker was added slowly to the diazo mixture in the first beaker over a period of 30 minutes, the contents of both beakers, being maintained between about 0° and 5° C. and the temperature of the resulting mixture being held below about 8° C. by means of an ice bath.

After all of the contents of the second beaker had been added to the first beaker, the resulting solution was stirred to insure completion of the reaction. Then 30 grams of HCl (20° Bé.) was added to the beaker to render the contents positive to Congo paper test. The beaker and its contents were heated to about 90 to 95° C. and maintained at that temperature for about 2 hours after which they were cooled to 70° C. Sodium formate was added to remove Congo acidity.

The resulting mixture was filtered and the separated solid was washed salt free and acid free (to Blue Litmus). The solid was a yellow disazo pigment having the structure

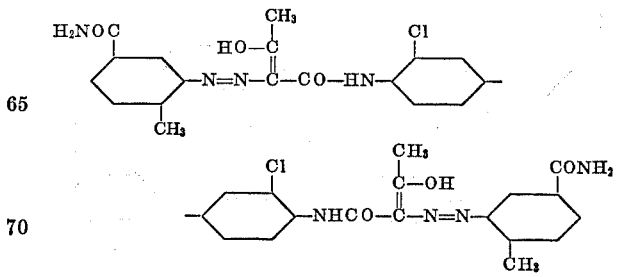

EXAMPLES 2, 3, 4 AND 5

The procedure of Example 1 was repeated, except that instead of the 15 grams of 3-amino, 4-methyl carbamide, the following were used:

| Example | Compound | Amount, grams |
|---|---|---|
| 2 | 3-amino, 4-chloro carbamide | 17 |
| 3 | 4-amino carbamide | 14 |
| 4 | 3-amino carbamide | 14 |
| 5 | 3-amino, 4-methoxy benzamide | 17 |

The pigments obtained in the above examples exhibit very good solvent fastness and good light fastness in a bright green shade of yellow, and exhibit a high coloring strength.

Having described a preferred ecbodiment of the invention, it is not intended that it be limited except as may be required by the appended claims.

The products of Examples 2, 3, 4 and 5 were found to have the following structures:

Example 2

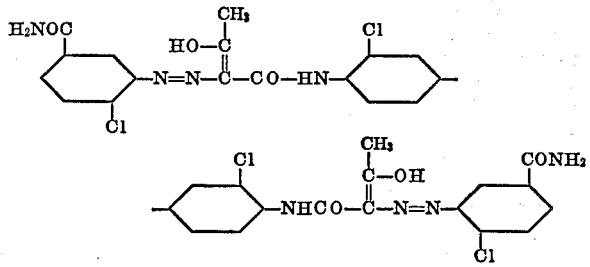

Example 3

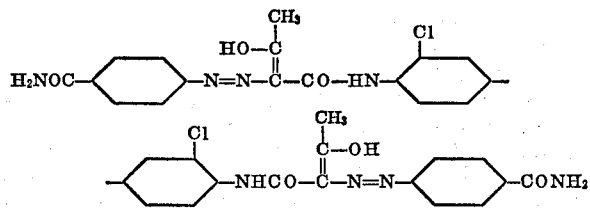

Example 4

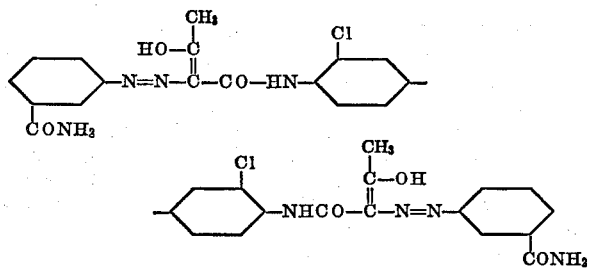

Example 5

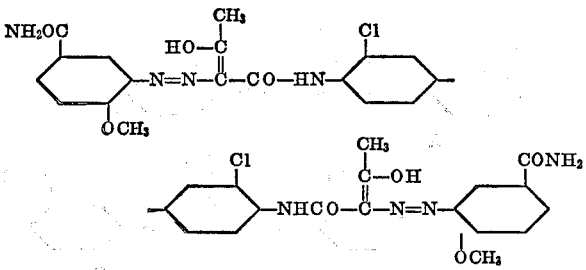

What is claimed is:
1. The water-insoluble disazo dyestuffs corresponding to the general formula

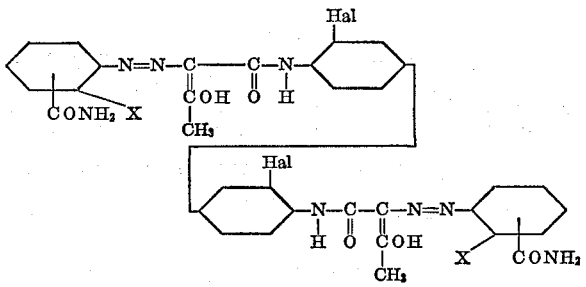

wherein each X represents a monovalent member of the group consisting of H, alkyl with 1–4 carbons, $OCH_3$ and halogen, and the X's are not required to be the same and the $CONH_2$ group is either meta or para to the diazo group, and Hal represents halogen.

2. The compound of claim 1 in which Hal represents chlorine.
3. The compound of claim 1 in which the $CONH_2$ group is meta to the diazo group.
4. The compound having the formula

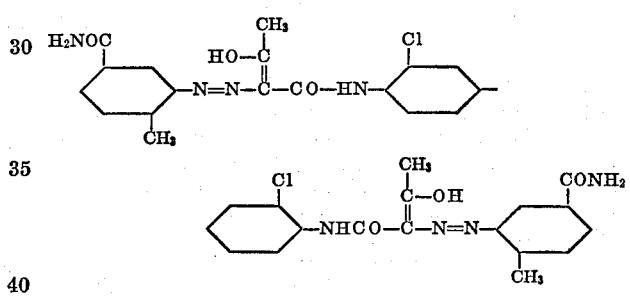

5. The compound having the formula

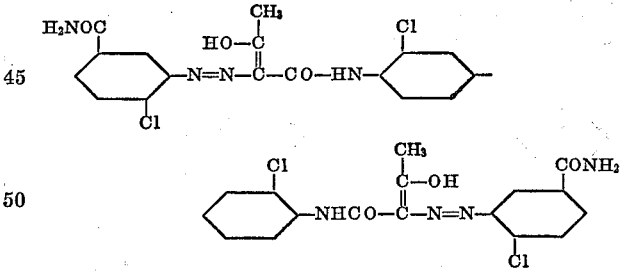

6. The compound having the formula

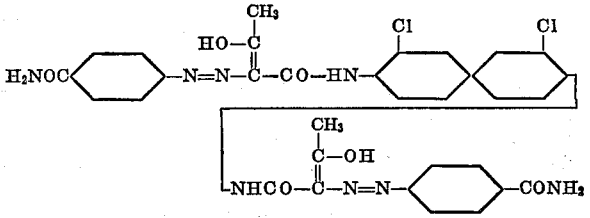

7. The compound having the formula

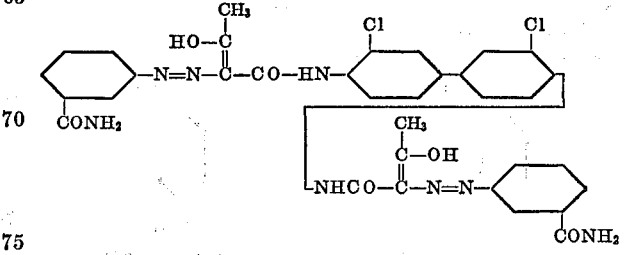

8. The compound having the formula
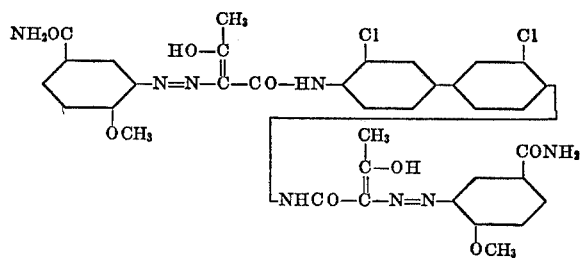
References Cited
UNITED STATES PATENTS
| | | | |
|---|---|---|---|
| 2,515,546 | 7/1950 | Bossard et al. | 260—176 |
| 2,807,609 | 9/1957 | Danuser et al. | 260—176 |
FOREIGN PATENTS
| | | | |
|---|---|---|---|
| 1,485,586 | 6/1967 | France | 260—176 |
FLOYD D. HIGEL, Primary Examiner
R. W. RAMSUER, Assistant Examiner